(12) United States Patent
Weder (10) Patent No.: US 6,176,372 B1
(45) Date of Patent: *Jan. 23, 2001

(54) FLORAL SLEEVE WITH STAGGERED BONDING MATERIAL

(75) Inventor: Donald E. Weder, Highland, IL (US)

(73) Assignee: Southpack Trust International, Inc.

( * ) Notice: Under 35 U.S.C. 154(b), the term of this patent shall be extended for 0 days.

This patent is subject to a terminal disclaimer.

(21) Appl. No.: 09/344,511

(22) Filed: Jun. 25, 1999

Related U.S. Application Data (63) Continuation-in-part of application No. 09/226,092, filed on Jan. 5, 1999, which is a continuation of application No. 08/971,397, filed on Nov. 14, 1997, now Pat. No. 5,890,592, which is a division of application No. 08/457,332, filed on Jun. 1, 1995, now Pat. No. 5,758,772, which is a continuation of application No. 08/333,105, filed on Nov. 1, 1994, now Pat. No. 5,664,403, which is a continuation of application No. 08/095,331, filed on Jul. 21, 1993, now Pat. No. 5,428,939, and a continuation-in-part of application No. 08/948,379, filed on Oct. 9, 1997, now abandoned, which is a division of application No. 08/764,479, filed on Dec. 12, 1996, now Pat. No. 5,829,225, which is a continuation-in-part of application No. 08/608,390, filed on Feb. 28, 1996, now Pat. No. 5,628,146, which is a continuation of application No. 08/457,186, filed on Jun. 1, 1995, now Pat. No. 5,572,849, which is a continuation of application No. 08/386,859, filed on Feb. 10, 1995, now Pat. No. 5,493,809, which is a continuation-in-part of application No. 08/237,078, filed on May 3, 1994, now Pat. No. 5,625,979.

(51) Int. Cl.[7] .................................................. B65D 85/50
(52) U.S. Cl. .......................................................... 206/423
(58) Field of Search .................................. 206/423, 460, 206/554; 229/87.01; 47/41.12, 41.13, 72, 84; 53/399

(56) References Cited

U.S. PATENT DOCUMENTS

Re. 21,065    5/1939   Copeman ................................... 93/2
D. 259,333    5/1981   Charbonneau ......................... D9/306

(List continued on next page.)

FOREIGN PATENT DOCUMENTS 4231978    6/1979   (AU) .
 654427    1/1965   (BE) .

(List continued on next page.)

OTHER PUBLICATIONS

Speed Cover Brochure, "The Simple Solution For Those Peak Volume Periods", Highland Supply Corporation, ©1989.

(List continued on next page.)

Primary Examiner—David T. Fidei
(74) Attorney, Agent, or Firm—Dunlap, Codding & Rogers, P.C.

(57) ABSTRACT

A plant packaging and covering system which includes a floral sleeve having a base portion, which may have a decorative pattern thereon. The sleeve may have an upper sleeve portion which can surround a plant disposed in a pot and which can be detached once the protective function of the upper sleeve portion is complete or which can be used to support the sleeve from a support device prior to use. The sleeve has on its inner surface a bonding material in an offset pattern, which can be used to form a crimped portion in the sleeve or which can be used to attach the sleeve to a pot.

24 Claims, 2 Drawing Sheets

U.S. PATENT DOCUMENTS

| | | | |
|---|---|---|---|
| D. 279,279 | 6/1985 | Wagner | D11/143 |
| D. 301,991 | 7/1989 | Van Sant | D11/149 |
| D. 335,105 | 4/1993 | Ottenwalder et al. | D11/164 |
| D. 368,025 | 3/1996 | Sekerak et al. | D9/305 |
| 524,219 | 8/1894 | Schmidt . | |
| 732,889 | 7/1903 | Paver . | |
| 950,785 | 3/1910 | Pene . | |
| 1,063,154 | 5/1913 | Bergen . | |
| 1,446,563 | 2/1923 | Hughes . | |
| 1,520,647 | 12/1924 | Hennigan . | |
| 1,525,015 | 2/1925 | Weeks . | |
| 1,610,652 | 12/1926 | Bouchard . | |
| 1,697,751 | 1/1929 | Blake | 229/87 |
| 1,863,216 | 6/1932 | Wordingham . | |
| 1,978,631 | 10/1934 | Herrlinger | 91/68 |
| 2,048,123 | 7/1936 | Howard | 229/87 |
| 2,170,147 | 8/1939 | Lane | 206/56 |
| 2,200,111 | 5/1940 | Bensel | 229/1.5 |
| 2,278,673 | 4/1942 | Savada et al. | 154/43 |
| 2,302,259 | 11/1942 | Rothfuss | 41/10 |
| 2,323,287 | 7/1943 | Amberg | 229/53 |
| 2,355,559 | 8/1944 | Renner | 229/8 |
| 2,371,985 | 3/1945 | Freiberg | 206/46 |
| 2,411,328 | 11/1946 | MacNab | 33/12 |
| 2,510,120 | 6/1950 | Leander | 117/122 |
| 2,529,060 | 11/1950 | Trillich | 117/68.5 |
| 2,621,142 | 12/1952 | Wetherell | 154/117 |
| 2,648,487 | 8/1953 | Linda | 229/55 |
| 2,688,354 | 9/1954 | Berger | 150/28 |
| 2,774,187 | 12/1956 | Smithers | 47/41 |
| 2,822,287 | 2/1958 | Avery | 117/14 |
| 2,846,060 | 8/1958 | Yount | 206/58 |
| 2,850,842 | 9/1958 | Eubank, Jr. | 47/58 |
| 2,883,262 | 4/1959 | Borin | 21/56 |
| 2,989,828 | 6/1961 | Warp | 53/390 |
| 3,022,605 | 2/1962 | Reynolds | 47/58 |
| 3,080,680 | 3/1963 | Reynolds | 47/37 |
| 3,094,810 | 6/1963 | Kalpin | 47/37 |
| 3,121,647 | 2/1964 | Harris et al. | 118/202 |
| 3,130,113 | 4/1964 | Silman | 161/97 |
| 3,271,922 | 9/1966 | Wallerstein et al. | 53/3 |
| 3,322,325 | 5/1967 | Bush | 229/62 |
| 3,376,666 | 4/1968 | Leonard | 47/41 |
| 3,380,646 | 4/1968 | Doyen et al. | 229/57 |
| 3,431,706 | 3/1969 | Stuck | 53/390 |
| 3,508,372 | 4/1970 | Wallerstein et al. | 53/3 |
| 3,510,054 | 5/1970 | Sanni et al. | 229/66 |
| 3,512,700 | 5/1970 | Evans et al. | 229/53 |
| 3,552,059 | 1/1971 | Moore | 47/41.12 |
| 3,554,434 | 1/1971 | Anderson | 229/55 |
| 3,556,389 | 1/1971 | Gregoire | 229/53 |
| 3,557,516 | 1/1971 | Brandt | 53/14 |
| 3,620,366 | 11/1971 | Parkinson | 206/59 |
| 3,681,105 | 8/1972 | Milutin | 117/15 |
| 3,767,104 | 10/1973 | Bachman et al. | 229/7 |
| 3,793,799 | 2/1974 | Howe | 53/32 |
| 3,869,828 | 3/1975 | Matsumoto | 47/34.11 |
| 3,888,443 | 6/1975 | Flanigen | 248/152 |
| 3,962,503 | 6/1976 | Crawford | 428/40 |
| 4,043,077 | 8/1977 | Stonehocker | 47/66 |
| 4,054,697 | 10/1977 | Reed et al. | 428/40 |
| 4,091,925 | 5/1978 | Griffo et al. | 206/423 |
| 4,113,100 | 9/1978 | Soja et al. | 206/602 |
| 4,118,890 | 10/1978 | Shore | 47/28 |
| 4,189,868 | 2/1980 | Tymchuck et al. | 47/84 |
| 4,216,620 | 8/1980 | Weder et al. | 47/72 |
| 4,248,347 | 2/1981 | Trimbee | 206/423 |
| 4,265,049 | 5/1981 | Gorewitz | 47/26 |
| 4,280,314 | 7/1981 | Stuck | 53/241 |
| 4,297,811 | 11/1981 | Weder | 47/72 |
| 4,333,267 | 6/1982 | Witte | 47/84 |
| 4,347,686 | 9/1982 | Wood | 47/73 |
| 4,380,564 | 4/1983 | Cancio et al. | 428/167 |
| 4,400,910 | 8/1983 | Koudstall et al. | 47/84 |
| 4,413,725 | 11/1983 | Bruno et al. | 206/45.33 |
| 4,546,875 | 10/1985 | Zweber | 206/0.82 |
| 4,621,733 | 11/1986 | Harris | 206/423 |
| 4,640,079 | 2/1987 | Stuck | 53/390 |
| 4,717,262 | 1/1988 | Roen et al. | 383/120 |
| 4,733,521 | 3/1988 | Weder et al. | 53/580 |
| 4,765,464 | 8/1988 | Ristvedt | 206/0.82 |
| 4,771,573 | 9/1988 | Stengel | 47/67 |
| 4,773,182 | 9/1988 | Weder et al. | 47/72 |
| 4,801,014 | 1/1989 | Meadows | 206/423 |
| 4,810,109 | 3/1989 | Castel | 383/105 |
| 4,835,834 | 6/1989 | Weder | 29/525 |
| 4,941,572 | 7/1990 | Harris | 206/423 |
| 4,980,209 | 12/1990 | Hill | 428/34.1 |
| 5,073,161 | 12/1991 | Weder et al. | 493/154 |
| 5,074,675 | 12/1991 | Osgood | 383/122 |
| 5,105,599 | 4/1992 | Weder | 53/399 |
| 5,111,638 | 5/1992 | Weder | 53/397 |
| 5,120,382 | 6/1992 | Weder | 156/212 |
| 5,152,100 | 10/1992 | Weder et al. | 47/72 |
| 5,181,364 | 1/1993 | Weder | 53/397 |
| 5,199,242 | 4/1993 | Weder et al. | 53/397 |
| 5,205,108 | 4/1993 | Weder et al. | 53/397 |
| 5,228,234 | 7/1993 | de Klerk et al. | 47/41.01 |
| 5,235,782 | 8/1993 | Landau | 47/72 |
| 5,239,775 | 8/1993 | Landau | 47/72 |
| 5,249,407 | 10/1993 | Stuck | 53/399 |
| 5,259,106 | 11/1993 | Weder et al. | 29/469.5 |
| 5,307,606 | 5/1994 | Weder | 53/410 |
| 5,315,785 | 5/1994 | Avôt et al. | 47/72 |
| 5,350,240 | 9/1994 | Billman et al. | 383/104 |
| 5,353,575 | 10/1994 | Stepanek | 53/461 |
| 5,361,482 | 11/1994 | Weder et al. | 29/469 |
| 5,388,695 | 2/1995 | Gilbert | 206/423 |
| 5,428,939 | 7/1995 | Weder et al. | 53/397 |
| 5,443,670 | 8/1995 | Landau | 156/191 |
| 5,493,809 | 2/1996 | Weder et al. | 47/72 |
| 5,496,251 | 3/1996 | Cheng | 493/224 |
| 5,496,252 | 3/1996 | Gilbert | 493/224 |
| 5,526,932 | 6/1996 | Weder | 206/423 |
| 5,572,849 | 11/1996 | Weder et al. | 53/399 |
| 5,572,851 | 11/1996 | Weder | 53/399 |
| 5,575,133 | 11/1996 | Weder et al. | 53/397 |
| 5,617,703 | 4/1997 | Weder | 53/413 |
| 5,624,320 | 4/1997 | Martinez | 472/51 |
| 5,628,146 | 5/1997 | Weder et al. | 47/72 |
| 5,647,168 | 7/1997 | Gilbert | 47/72 |
| 5,664,403 | 9/1997 | Weder et al. | 53/397 |
| 5,890,592 | 4/1999 | Weder et al. | 206/423 |

FOREIGN PATENT DOCUMENTS

| | | |
|---|---|---|
| 560532 | 4/1975 | (CH) . |
| 345464 | 12/1921 | (DE) . |
| 513971 | 11/1930 | (DE) . |
| 1166692 | 3/1964 | (DE) . |
| 1962947 | 6/1971 | (DE) . |
| 2060812 | 11/1971 | (DE) . |
| 2748626 | 5/1979 | (DE) . |
| 3445799 | 6/1986 | (DE) . |
| 3829281 | 5/1989 | (DE) . |
| 3911847 | 10/1990 | (DE) . |
| 0050990 | 5/1982 | (EP) . |
| 0791543 | 8/1997 | (EP) . |
| 1376047 | 9/1964 | (FR) . |
| 2036163 | 12/1970 | (FR) . |
| 2137325 | 12/1972 | (FR) . |
| 2272914 | 12/1975 | (FR) . |

| | | |
|---|---|---|
| 2489126 | 3/1982 | (FR) . |
| 2610604 | 8/1988 | (FR) . |
| 2603159 | 3/1989 | (FR) . |
| 2619698 | 3/1989 | (FR) . |
| 5605 | 5/1885 | (GB) . |
| 1204647 | 9/1970 | (GB) . |
| 2056410 | 3/1981 | (GB) . |
| 2074542 | 11/1981 | (GB) . |
| 2128083 | 4/1984 | (GB) . |
| 2252708 | 8/1992 | (GB) . |
| 224507 | 4/1996 | (IT) . |
| 542958 | 2/1993 | (JP) . |
| 8301709 | 12/1984 | (NL) . |
| 1000658 | 1/1996 | (NL) . |
| 9315979 | 8/1993 | (WO) . |

OTHER PUBLICATIONS

"Speed Sheets and Speed Rolls" Brochure, Highland Supply Corporation, ©1990.

"Color Them Happy with Highlander Products" ©1992.

"Costa Keeps the Christmas Spirit", Supermarket Floral, Sep. 15, 1992.

"Super Seller", Supermarket Floral, Sep. 15, 1992.

"Halloween", Link Magazine, Sep. 1992, 2 pages.

"Now More Than Ever", Supermarket Floral, Sep. 15, 1992.

Le Plant Sac Advertisement, published prior to Sep. 16, 1987.

"A World of Cut Flower and Pot Plant Packaging" Brochure, Klerk's Plastic Products Manufacturing, Inc., published prior to Mar. 31, 1994, 6 pages.

Chantler & Chantler brochure showing Zipper Sleeve™ and Florasheet®, published prior to Mar 31, 1994, 2 pages.

"Foil Jackets" brochure, Custom Medallion, Inc., Dec., 1996, 2 pages.

"Derwent Abstract" of FR 2610604A. It is noted that the abstract is an incorrect English translation of the contents of the French patent. The French patent does not enable or disclose adhesively attaching the covering to the container. 1988.

FLORAL SLEEVE WITH STAGGERED BONDING MATERIAL

CROSS-REFERENCE TO RELATED APPLICATIONS

The present application is a continuation-in-part of U.S. Ser. No. 09/226,092, filed Jan. 5, 1999, entitled "Sleeve-Type Floral Grouping Wrapper," which is a continuation of U.S. Ser. No. 08/971,397, filed Nov. 14, 1997, entitled "Sleeve-Type Floral Grouping Wrapper," now U.S. Pat. No. 5,890,592 issued on Apr. 6, 1999, which is a divisional of U.S. Ser. No. 08/457,332, filed Jun. 1, 1995, entitled "Sleeve-Type Floral Grouping Wrapper," now U.S. Pat. No. 5,758,772 issued on Jun. 2, 1998, which is a continuation of U.S. Ser. No. 08/333,105, filed Nov. 1, 1994, entitled "Method For crimping A Sleeve About A Floral Grouping," now U.S. Pat. No. 5,664,403 issued on Sep. 9, 1997, which is a continuation of U.S. Ser. No. 08/095,331, filed Jul. 21, 1993, entitled "Method For Crimping A Wrapper About A Floral Grouping," now U.S. Pat. No. 5,428,939 issued on Jul. 4, 1995.

The present application is also a continuation-in-part of U.S. Ser. No. 08/948,379, filed Oct. 9, 1997, entitled "Flower Pot Covered With A Sleeve," now abandoned which is a divisional of U.S. Ser. No. 08/764,479, filed Dec. 12, 1996, entitled "Method Of Covering A Flower Pot," now U.S. Pat. No. 5,829,225, issued on Nov. 3, 1998, which is a continuation-in-part of U.S. Ser. No. 08/608,390, filed Feb. 28, 1996, entitled "Sleeve Having a Detachable Portion For Forming A Pot Cover," now U.S. Pat. No. 5,628,146, issued on May 13, 1997, which is a continuation of U.S. Ser. No. 08/457,186, filed Jun. 1, 1995, entitled "Method of Packaging A Potted Plant," now U.S. Pat. No. 5,572,849, issued on Nov. 12, 1996, which is a continuation of U.S. Ser. No. 08/386,859, filed Feb. 10, 1995, entitled "Sleeve Having A Detachable Portion For Forming A Pot Cover," now U.S. Pat. No. 5,493,809, issued on Feb. 27, 1996, which is a continuation-in-part of U.S. Ser. No. 08/237,078, filed May 3, 1994, entitled "Sleeve Having A Detachable Portion Forming A Skirt And Methods,"now U.S. Pat. No. 5,625, 979, issued on May 6, 1997. The specifications of each of the above-identified applications are hereby specifically incorporated herein by reference in their entirety.

STATEMENT REGARDING FEDERALLY SPONSORED RESEARCH OR DEVELOPMENT

Not Applicable

BACKGROUND

This invention generally relates to sleeves, and more particularly, sleeves used to contain or wrap a floral assembly comprising a floral grouping or a flower pot containing a floral grouping and/or mediums containing a floral grouping, and methods of using same.

DETAILED DESCRIPTION OF THE INVENTION

The present invention contemplates in a preferred version a preformed tubular sleeve for covering a floral assembly, which in one embodiment comprises a pot having an upper end, a lower end, and an outer peripheral surface and comprises a floral grouping. Said preformed sleeve comprises a lower portion having an upper end, a lower end, and an interior space and optionally may have a skirt portion. The preformed sleeve may further comprise a detachable upper sleeve portion generally sized to surround and enclose a floral grouping or a portion of a floral grouping provided as a bouquet or disposed in the pot. The upper portion when present may be detachable via perforations, tear strips, weakened areas, or zippers. The upper sleeve portion may have one or more apertures or an extended upper portion for serving as a handle or support device and may have closure means for closing the upper end of the sleeve.

The tubular sleeve may form part of a plant package when used in conjunction with a flower pot or floral grouping disposed within the retaining space of the base portion of the tubular sleeve, the flower pot having a floral grouping disposed therein, and wherein the pot assembly is substantially surrounded and encompassed by a base portion of the lower portion and the floral grouping is substantially surrounded and enclosed by the upper sleeve portion when it forms a part of the preformed sleeve.

Also, a portion of the sleeve comprises a bonding material disposed on an inner portion thereof for bondingly connecting to portions of the sleeve for forming a crimped portion or for bondingly connecting to a pot disposed within the sleeve. Or the bonding material may be disposed on an outer portion thereof. In a preferred version the bonding material is located on the inner surface in a staggered configuration as described in more detail below.

In one version of the invention, a portion of the lower portion of the preformed tubular sleeve is constructed from a first material and the upper portion (where present) constructed from a second material different from the first material. The preformed sleeve may comprise a portion of a plant package which additionally comprises a pot assembly disposed within the sleeve, the pot assembly having a floral grouping disposed therein, and wherein the pot of the pot assembly is substantially surrounded and enclosed by the lower portion or by a base portion of the lower portion.

These embodiments and others of the present invention are now described in more detail below. It will be appreciated that the examples provided herein are not intended to limit the scope and extent of the claimed invention but are only intended to exemplify various of the embodiments of the invention contemplated herein.

The Embodiments and Methods of Use of FIGS. 1–7

Shown in FIGS. 1–4 and designated therein by the general reference numeral 10 is a flexible preformed sleeve of unitary construction. The sleeve 10 preferably initially comprises a flexible flat collapsed piece of material which is openable into the form of a tube or sleeve. In an alternative embodiment, the sleeve may be formed in an opened frusto-conical configuration. The sleeve 10 is preferably tapered outwardly from the lower end toward a larger diameter at its upper end. In its flattened state the sleeve 10 has an overall trapezoidal or modified trapezoidal shape, and when opened is substantially frusto-conical to coniform. It will be appreciated, however, that the sleeve 10 may comprise variations on the aforementioned shapes or may comprise significantly altered shapes such as square or rectangular, wherein the sleeve 10 when opened has a cylindrical form, as long as the sleeve 10 functions in accordance with the present invention in the manner described herein.

Figures 1, 2:
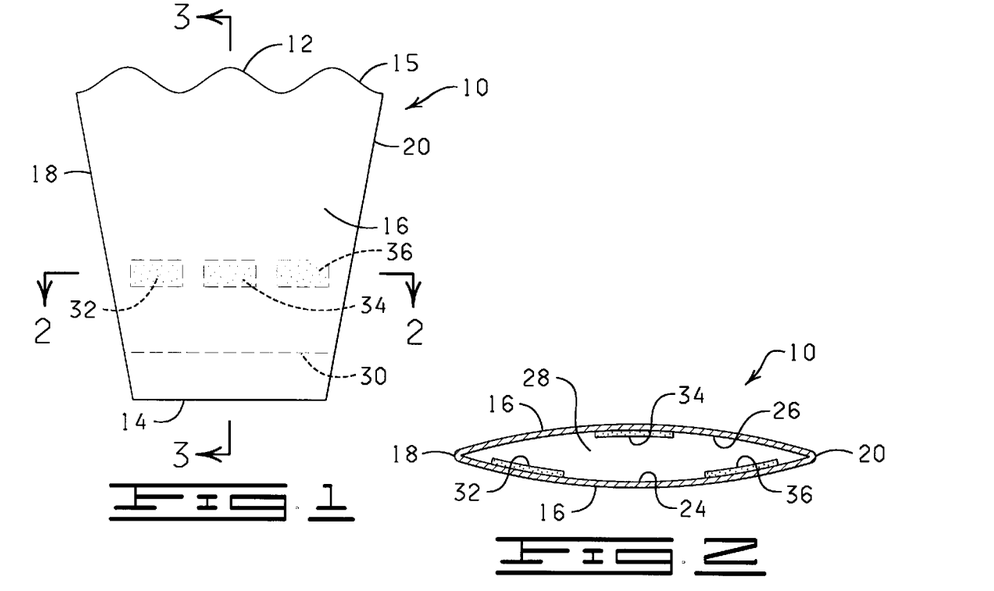
FIG. 1 is a side view of a sleeve having staggered areas of bonding material disposed thereon in accordance with the present invention.
FIG. 2 a sectional view of the sleeve of FIG. 1.
Figure 3:
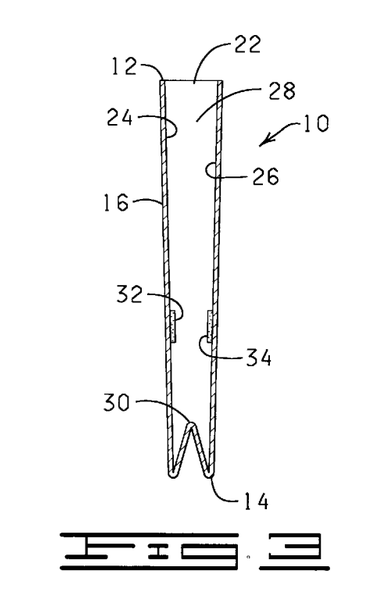
FIG. 3 a side sectional view of the sleeve of FIG. 1.
Figure 4:
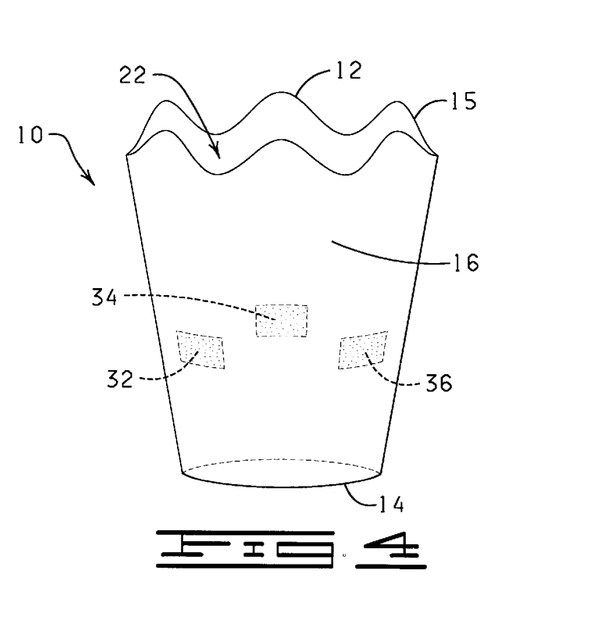
FIG. 4 is a perspective view of the sleeve of FIG. 1 in an open configuration.

The sleeve 10 has an upper end 12, a lower end 14, an outer peripheral surface 16 and in its flattened state has a first side 18 and a second side 20. The sleeve 10 has an opening 22 at the upper end 12 when opened and may be open at the lower end 14 (not shown), or closed with a bottom surface at the lower end 14. The sleeve 10 also has a first inner peripheral surface 24 and a second inner peripheral surface 26 opposite to first inner peripheral surface 24 which, when the sleeve 10 is opened, defines and encompasses an inner retaining space 28 as indicated in FIGS. 2–3. When the lower end 14 of the sleeve 10 is closed, a portion of the lower end 14 may be inwardly or even outwardly folded to form one or more gussets 30 constructed in a manner well known to one of ordinary skill in the art as shown in FIG. 1 and FIG. 3 for permitting a bottom of an object such as a potted plant to be disposed into the inner retaining space of the lower end 14 of the sleeve 10. Further the lower end 14 may be constructed to have a rounded bottom as shown in copending U.S. Ser. No. 08/606,957, the specification of which is hereby incorporated herein in its entirety. In an alternative embodiment, the sleeve 10 (and any sleeve defined herein) may be formed without a gusset in the lower end.

The sleeve 10 is generally frusto-conically shaped, but the sleeve 10 may be, by way of example but not by way of limitation, cylindrical, frusto-conical, a combination of both frusto-conical and cylindrical, or any other shape, as long as the sleeve 10 functions as described herein. Further, the sleeve 10 may comprise any shape, whether geometric, non-geometric, asymmetrical and/or fanciful as long as it functions in accordance with the present invention. The sleeve 10 may also be equipped with drainage means (e.g., one or more holes) in the base portion or bottom thereof or ventilation holes (not shown) in the base or upper portion where present, and can be made from gas or moisture-permeable or impermeable materials.

The material from which the sleeve 10 is constructed preferably has a thickness in a range from about 0.1 mils to about 30 mils. Often, the thickness of the sleeve 10 is in a range from about 0.5 mils to about 10 mils. Preferably, the sleeve 10 has a thickness in a range from about 1.0 mil to about 5 mils. More preferably, the sleeve 10 is constructed from a material which is flexible, semi-rigid, rigid, or any combination thereof. The sleeve 10 may be constructed of a single layer of material or a plurality of layers of the same or different types of materials. Any thickness of the material may be utilized as long as the material functions in accordance with the present invention as described herein. The layers of material comprising the sleeve 10 may be connected together or laminated or may be separate layers. Such materials used to construct the sleeve 10 are described in U.S. Pat. No. 5,111,637 entitled "Method For Wrapping A Floral Grouping" issued to Weder et al., on May 12, 1992, which is hereby incorporated herein by reference. Any thickness of material may be utilized in accordance with the present invention as long as the sleeve 10 may be formed as described herein, and as long as the formed sleeve 10 may contain at least a portion of a pot or potted plant or a floral grouping, as described herein. Additionally, an insulating material such as bubble film, preferable as one of two or more layers, can be utilized in order to provide additional protection for the item, such as the floral grouping, contained therein.

In one embodiment, the sleeve 10 may be constructed from a sheet comprising two polypropylene films. The material comprising the sleeve 10 may be connected together or laminated or may be separate layers. In an alternative embodiment, the sleeve 10 may be constructed from only one of the polypropylene films.

The sleeve 10 is constructed from any suitable material that is capable of being formed into a sleeve and wrapped about a pot and a floral grouping disposed therein. Preferably, the material comprises paper (untreated or treated in any manner), cellophane, metal foil, polymer film, non-polymer film, fabric (woven or nonwoven or synthetic or natural), cardboard, fiber, cloth, burlap, or laminations or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The material comprising the sleeve 10 may vary in color and as described herein consists of designs or decorative patterns which are printed, etched, and/or embossed thereon using inks or other printing materials. An example of an ink which may be applied to the surface of the material is described in U.S. Pat. No. 5,147,706 entitled "Water Based Ink On Foil And/Or Synthetic Organic Polymer" issued to Kingman on Sep. 15, 1992, and which is hereby incorporated herein by reference.

In addition, the material may have various colorings, coatings, flocking and/or metallic finishes, or other decorative surface ornamentation applied separately or simultaneously or may be characterized totally or partially by pearlescent, translucent, transparent, iridescent, neon, or the like, qualities. The material may further comprise, or have applied thereto, one or more scents. Each of the above-named characteristics may occur alone or in combination and may be applied to the upper and/or lower surface of the material comprising the sleeve 10. Moreover, portions of the material used in constructing the sleeve 10 may vary in the combination of such characteristics. The material utilized for the sleeve 10 itself may be opaque, translucent, transparent, or partially clear or tinted transparent.

The term "floral grouping" as used herein means a bouquet of cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping comprises a bloom or foliage portion and a stem portion. Further, the floral grouping may comprise a growing potted plant having a root portion (not shown) as well. However, it will be appreciated that the floral grouping may consist of only a single bloom or only foliage, or a botanical item (not shown), or a propagule (not shown). The term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

In accordance with the present invention in one embodiment shown in FIGS. 1–4, two or more patches of bonding material are disposed on portions of the inner surfaces 24 and 26 of the sleeve 10 in blocks. Further, the bonding material may be disposed as spots of bonding material, or in any other geometric, nongeometric, asymmetric, or fanciful form, and in any pattern. The bonding material may be covered by a cover or release strip which can be removed prior to the use of the sleeve as discussed in more detail below. The bonding material can be applied by means known to those of ordinary skill in their art. One method for disposing a bonding material, in this case an adhesive, is described in U.S. Pat. No. 5,111,637 entitled "Method For Wrapping A Floral Grouping" issued to Weder et al., on May 12, 1992, which has been incorporated by reference above.

The term "bonding material or bonding means" when used herein means an adhesive, frequently a pressure sensitive adhesive, or a cohesive. When the bonding material is a cohesive, a similar cohesive material must be placed on the adjacent surface for bondingly contacting and bondingly engaging with the cohesive material.

Alternatively, a cold seal adhesive may be utilized as the bonding material or means. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

In the preferred embodiment, the areas of bonding material on the inner surfaces 24 and 26 of the sleeve are offset (staggered) so an area of bonding material on one of the inner surfaces 24 or 26 does not directly face or oppose an area of bonding material on the opposite inner surface.

For example, shown in sleeve 10 of FIGS. 1–4 are three areas or patches of bonding material designated by reference numerals 32, 34 and 36. Bonding material patches 32 and 36 are on inner surface 24 while patch 34 is on inner surface 26 which faces inner surface 24. Bonding patch 34 is positioned between and opposite bonding patches 32 and 36 such that when sleeve 10 is in a flattened condition, bonding patch 34 does not overlap with bonding patches 32 or 36. In a preferred embodiment, the bonding material is a cohesive material which bonds only to a like surface, wherein when the sleeve 10 is in a flattened condition, and the patches of bonding material 32, 34 and 36 are appressed against or touch the opposite inner surface of the sleeve (not covered by a cohesive bonding material), the patches of cohesive bonding material do not bondingly connect with the opposite surfaces, because a like cohesive material is not disposed on said opposite surfaces.

Figure 5:
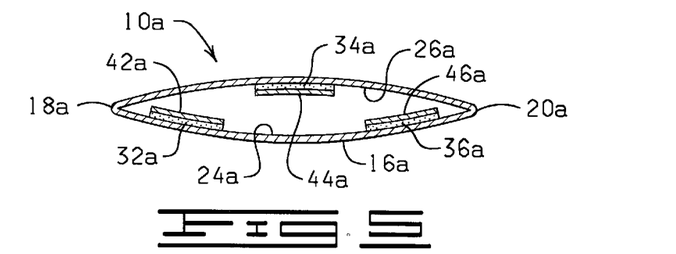
FIG. 5 is a sectional view of another sleeve constructed in accordance with the present invention.

In an alternative embodiment, a sleeve designated by the general reference numeral 10a is shown in FIG. 5. Sleeve 10a is exactly the same as sleeve 10 described above except 10a has an inner surface 24a having bonding material patch 32a and 36a thereon, and an inner surface 26a having a bonding material patch 34a thereon, and each of patches 32a, 34a and 36a have a layer of release material 42a, 44a and 46a disposed thereon, respectively. In this manner, the bonding material may comprise an adhesive material which is prevented by the release material from bondingly connecting to the opposite inner surfaces 24a or 26a of the sleeve 10a when the sleeve 10a is in a flattened condition.

Figure 6:
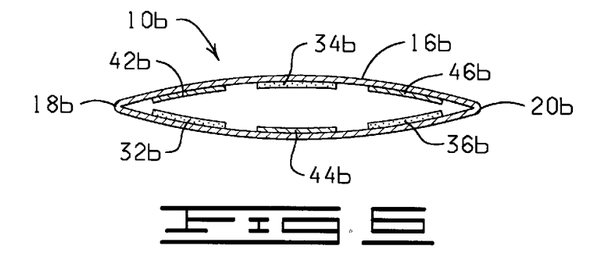
FIG. 6 is a sectional view of yet another sleeve constructed in accordance with the present invention.

An alternative embodiment shown in FIG. 6 is a sleeve designated by the general reference numeral 10b. Sleeve 10b is similar to sleeve 10 in comprising patches of bonding material 32b and 36b disposed on inner surface 24b and patch of bonding material 34b disposed on inner surface 26b of sleeve 10b, which are offset in the manner of sleeve 10. Sleeve 10b differs from sleeve 10 and sleeve 10a in that there are areas of "non-bondable" material 42b, 44b and 46b disposed on the inner surface of sleeve 10b which are opposite to bonding material patches 32b, 34b, and 36b, respectively. The portions of material which comprise the non-bondable material 42b, 44b and 46b are adhered to inner surfaces 24b, 26b and 24b, respectively, yet do not adhere, or at least are readily detachable from the bonding material which comprises the bonding material patches 32b, 34b and 36b. Therefore, when the sleeve 10b is in a flattened condition, the bonding material patches 32b, 34b, and 36b do not adhere to the portions of the inner surface of the sleeve 10b which are opposite thereto.

It will be readily understood by a person of ordinary skill in the art that the distribution of the patches of bonding material shown on the sleeves represented in FIGS. 1–7 herein is but one pattern out of a wide variety of patterns which would function in accordance with the present invention. For example, there may be more numerous but smaller patches. Or, the patches may be arranged vertically, diagonally, or in two or more horizontal rows rather than the single horizontal row shown herein.

Further, when the sleeve is designed to contain a pot, the areas of bonding material may be disposed below the pot rim or above the pot rim. When the bonding material is disposed above the pot rim the portions of the sleeve bearing the bonding material may be crimped together to form a crimped portion comprising overlapping folds in the sleeve to secure the sleeve about the pot. Alternatively, the bonding material may be used to effect the bonding of overlapping portions of the sleeve below the upper thereby forming a crimped portion in the sleeve in a position about a portion of an outer surface of the pot contained within the sleeve. Alternatively, the patches of bonding material may serve to connect the sleeve to a portion of the outer surface of the pot.

When the sleeve is used to contain or wrap a floral grouping not contained within a pot, the patches of bonding material may be crimpingly connected to form a crimped portion in the sleeve to hold the sleeve about the floral grouping, preferably in a position about the stem portion of the floral grouping.

Figure 7:
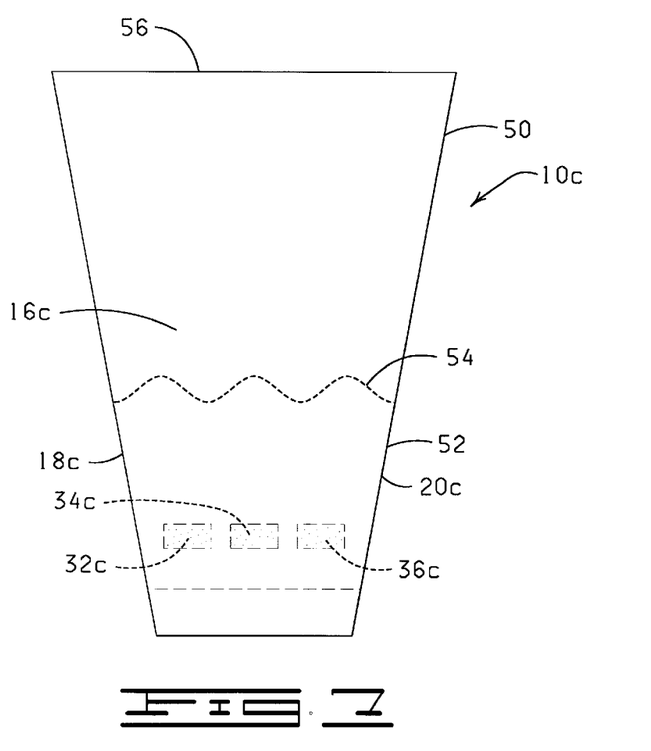
FIG. 7 is a side view of another sleeve constructed in accordance with the present invention, the sleeve having a detachable upper portion.

As shown in FIG. 7, a sleeve 10c in one embodiment is demarcated into an upper portion 50 and a lower portion 52. In one embodiment, the lower portion 52 of the sleeve 10c is generally sized to contain a potted plant. Preferably, the lower portion 52 is tapered to fit the shape of a standard pot, for example of 4, 6 or 8 inches. The upper portion 50 of the sleeve 10c is typically sized to substantially surround and enclose a floral grouping contained within the potted plant disposed within the lower portion 52 of the sleeve 10c. The sleeve 10c is demarcated into the upper portion 50 and the lower portion 52 by a detaching element 54 for enabling the detachment of the upper portion 50 of the sleeve 10c from the lower portion 52 of the sleeve 10c. In the present version, the detaching element 54 is a plurality of horizontally-oriented perforations comprising a straight, curved or otherwise non-linear horizontal line which extends circumferentially across the outer peripheral surface 16c of the sleeve 10c from the first side 18c to the second side 20c. The term "detaching element," or "detaching means" as used generally herein, means any element or means, or combination of elements, or features, such as, but not by way of limitation, perforations, tear strips, zippers, and any other devices or elements of this nature known in the art, or any combination thereof, which enable the tearing away or detachment of one object from another. Therefore, while perforations are shown and described in detail herein, it will be understood that tear strips, zippers, or any other "detaching elements" known in the art, or any combination thereof, could be substituted therefore and/or used therewith.

In one preferred embodiment, as shown in U.S. Ser. No. 09/067,498, the specification and drawings of which are specifically incorporated herein in their entirety by reference, the sleeve 10c has a decorative pattern disposed upon or inherent to the lower portion 52 which is positioned on the lower portion 52 below the detaching element, which in the preferred embodiment is a horizontal line of perforations.

The sleeve of the present invention may be constructed to have a closure bonding material disposed on or near an upper end portion of the upper portion of the sleeve for enabling closure of the upper portion after a potted plant has been disposed within the sleeve or after a floral grouping has been disposed therein.

The sleeve of the present invention may also have a bonding material on an outer surface of the lower or upper portion thereof. The bonding material on the outer surface may be used to form a crimped portion in the lower portion.

The sleeve may have an aperture in an upper end of the upper portion for use as a handle, for enabling the sleeve having a pot or floral grouping disposed therein to be carried.

The upper portion 50 of the sleeve 10c may also have an additional vertical detaching element comprising a plurality of vertical perforations (not shown) for facilitating removal of the upper portion 50 and which are disposed more or less vertically therein extending between the detaching element 54 of the sleeve 10c and its upper end.

It will be understood by a person of ordinary skill in the art that equipment and devices for forming floral sleeves to contain pots or floral groupings are commercially available, and are well known to a person of ordinary skill in the art. Therefore, further discussion of the construction of the covers described herein is not deemed necessary.

As noted above, any of sleeves described herein may have an open or closed lower end. When the lower end is closed, the lower end may have one or more gussets formed therein for allowing expansion of the lower end when an object with a broad lower end such as a pot is disposed therein. In another version of the sleeve, the sleeve may comprise a flap positioned at the upper end of the upper portion which can be folded over and sealed with a flap bonding strip to an adjacent portion of the outer peripheral surface of the sleeve near the upper end thereof. Other versions of the sleeve (not shown) may comprise ventilation holes or drainage means (e.g., holes) in the lower or upper portion for allowing movement of gases or moisture to and away from the inner space of the sleeve.

As noted above, it will often be desired to use the sleeves described herein as coverings for a potted plant. The potted plant comprises a pot having an upper end, a lower end, an outer peripheral surface, and an inner peripheral surface which encompasses an inner space for retaining a floral grouping or plant. The lower end of the pot is closed but may have holes for permitting water drainage. The term "pot" as used herein refers to any type of container used for holding a floral grouping or plant. Examples of pots, used in accordance with the present invention include, but not by way of limitation, clay pots, wooden pots, plastic pots, pots made from natural made or synthetic fibers, or any combination thereof. The pot is adapted to receive a floral grouping in the retaining space. The floral grouping may be disposed within the pot along with a suitable growing medium described in further detail below, or other retaining medium, such as a floral foam. It will also be understood that a floral grouping may be disposed with or without a growing medium or other retaining medium in the sleeve without a pot.

In yet another version of the method of the present invention, a bonding material may be disposed on both the outer surface of the pot and the inner peripheral surface of any of the sleeves mentioned herein. In such a case, preferably the bonding material both of the pot and the sleeve is a cohesive which allows bonding to a surface covered with the cohesive but not to dissimilar surfaces.

As shown in FIGS. 1–7, the decorative pattern preferably comprises a curved upper boundary. The configuration of the upper end of the sleeve, or of the perforations if present is not limited to a "straight" or "curved" design and may be constructed in any number of other "non-linear" patterns, several being shown in FIGS. 12A–12D of U.S. Ser. No. 09/067,498, incorporated herein as noted above. One of ordinary skill in the art will understand these are but a few of the patterns that the upper end or perforations may form and one of ordinary skill could contemplate many other suitable patterns.

The sleeves described herein may be formed by intermittently advancing two separate webs, one or two webs preformed in the form of a tube, or a single web folded double and sealing the longitudinal sides and bottom of the two facing panels then cutting the sleeve thus formed from the webs or web. Machines which can form sleeves from such single webs or pairs of webs are well within the knowledge of one of ordinary skill in the art.

For all versions of sleeves described above which have a bonding material thereon, a release material or cover strip may cover the adhesive or cohesive bonding material disposed on any portion of the sleeve for preventing the bonding material from bonding to another surface until the desired time. Further in each of the cases described herein wherein a sleeve is applied to a pot or a covered pot, the sleeve may be applied thereto either by depositing the pot or covered pot downwardly into the open retaining space of the sleeve, or the sleeve may be brought upwardly about the pot or covered pot from below the pot or a covered pot.

It should be further noted that various features of the versions of the present invention such as closure bonding areas, support apertures, handles or handle apertures, additional perforations, drainage means, ventilation holes, combinations of material may be used alone or in combination as elements of any of the embodiments described above herein.

Changes may be made in the construction and the operation of the various components, elements and assemblies described herein or in the steps or the sequence of steps of the methods described herein without departing from the spirit and scope of the invention as defined in the following claims.

What is claimed is:

1. A preformed tubular floral sleeve, comprising:
   an upper end, a lower end, a first inner peripheral surface, a second inner peripheral surface when in a flattened state and an outer peripheral surface and adapted to be opened to form an inner retaining space sized to contain a floral grouping, and
   a bonding material disposed on a portion of the first inner peripheral surface and on a portion of the second inner peripheral surface and wherein the bonding material on the first inner peripheral surface is offset in relation to the bonding material on the second inner peripheral surface.

2. The floral sleeve of claim 1 further comprising an upper portion extending from the upper end and wherein the upper portion is detachable via perforations.

3. The floral sleeve of claim 1 further comprising a base portion and a skirt portion.

4. The floral sleeve of claim 1 further comprising a release material disposed upon the bonding material.

5. The floral sleeve of claim 1 wherein the bonding material is an adhesive material.

6. The floral sleeve of claim 1 wherein the bonding material is a cohesive material.

7. The floral sleeve of claim 1 wherein the sleeve is constructed from a material selected from the group consisting of treated or untreated paper, cellophane, metal foil, polymer film, non-polymer film, cardboard, fiber, cloth, burlap, and laminations or combinations thereof.

8. The floral sleeve of claim 2 further comprising a closure bonding material disposed near an upper end of the upper portion.

9. The floral sleeve of claim 1 wherein the lower end has a gusset therein.

10. The floral sleeve of claim 1 wherein the lower end is open.

11. The floral sleeve of claim 1 wherein the lower end is closed.

12. The floral sleeve of claim 2 wherein the perforations comprise a non-linear pattern.

13. The floral sleeve of claim 1 wherein the upper end comprises a non-linear edge.

14. A floral sleeve, comprising:
    a lower portion having a first inner peripheral surface and a second inner peripheral surface when in a flattened state and an outer peripheral surface and adapted to be opened to form an inner retaining space sized to contain a floral grouping;
    an upper portion connected to the lower portion and detachable therefrom via perforations; and
    a bonding material disposed on a portion of the first inner peripheral surface and on a portion of the second inner peripheral surface and wherein the bonding material on the first inner peripheral surface is offset in relation to the bonding material on the second inner peripheral surface.

15. The floral sleeve of claim 14 wherein the lower portion further comprises a base portion and a skirt portion.

16. The floral sleeve of claim 14 further comprising a release material disposed upon the bonding material.

17. The floral sleeve of claim 14 wherein the bonding material is an adhesive material.

18. The floral sleeve of claim 14 wherein the bonding material is a cohesive material.

19. The floral sleeve of claim 14 wherein the sleeve is constructed from a material selected from the group consisting of treated or untreated paper, cellophane, metal foil, polymer film, non-polymer film, cardboard, fiber, cloth, burlap, and laminations or combinations thereof.

20. The floral sleeve of claim 14 further comprising a closure bonding material disposed near an upper end of the upper portion.

21. The floral sleeve of claim 14 wherein the lower end of the lower portion has a gusset therein.

22. The floral sleeve of claim 14 wherein the lower end is open.

23. The floral sleeve of claim 14 wherein the lower end is closed.

24. The floral sleeve of claim 14 wherein the perforations comprise a non-linear pattern.

* * * * *

UNITED STATES PATENT AND TRADEMARK OFFICE
CERTIFICATE OF CORRECTION

PATENT NO.    : 6,176,372 B1
DATED         : January 23, 2001
INVENTOR(S)   : Donald E. Weder It is certified that error appears in the above-identified patent and that said Letters Patent is hereby corrected as shown below:

Column 1,
Line 58, after word "is" and before word "view" delete words "a side" and add words -- an elevational --.
Lines 61 and 66, after word "a" change word "sectional" to -- cross-sectional --.
Line 63, after word "a" delete words "side sectional" and add the following words -- vertical cross-sectional --.

Column 2,
Line 1, after word "a" change word "sectional" to word -- cross-sectional --.
Line 3, after word "is" and before word "view" delete words "a side" and add words -- an elevational --.
Line 14, before word "preformed" change word "Said" to word -- The --.
Lines 18, 22 and 33, after word "upper" and before word "portion" delete word "sleeve".
Line 25, before word "for" change word "means" to word -- element --.

Column 3,
Line 13, after number "14," add following phrase -- a skirt portion 15, --.
Line 43, after word "with" and before word "drainage" add word -- a --; and after word "drainage" change word "means" to word -- element --.
Line 49, after number "0.1" change word "mils" to word -- mil --.
Line 51, after number "0.5" change word "mils" to word -- mil --.

Column 4,
Line 18, delete word "cellophane".

Column 5,
Lines 20, 55 and 57, delete phrase "inner surface 24 and 26" and add following phrase -- first inner peripheral surface 24 and second inner peripheral surface 26 --.
Line 33, after word "material" delete words "or bonding means".
Line 40, after word "material" delete words "or means".
Line 56, after word "area" and before word "of" add word -- (patch) --.
Line 62, after words "inner" and before words "surface" add word -- peripheral -- in both places on line.
Line 63, after word "inner" and before word "surface" add word -- peripheral --; and before number "34" change words "Bonding patch" to word -- Patch --.
Line 64, after word "opposite" and before word "patches" delete word "bonding".
Line 65, after word "condition" and before word "patches" delete word "bonding".
Line 66, after word "with" and before word "patches" delete word "bonding".

UNITED STATES PATENT AND TRADEMARK OFFICE
CERTIFICATE OF CORRECTION

PATENT NO.     : 6,176,372 B1
DATED          : January 23, 2001
INVENTOR(S)    : Donald E. Weder It is certified that error appears in the above-identified patent and that said Letters Patent is hereby corrected as shown below:

Column 6,
Lines 2 and 3, delete phrase "of bonding material".
Line 12, after word "inner" and before word "surface" add word -- peripheral --; and after word "having" and before word "patch" delete phrase "bonding material".
Line 13, after number "36a" add phrase "of bonding material --; and after, word "inner" and before word "surface" add word -- peripheral --.
Line 14, before word "patch" delete phrase "bonding material"; and after number "34a" add phrase -- of bonding material --.
Line 17, delete phrase "bonding material" and add phrase -- patches 32a, 34a, and 36a --.
Line 18, after word "material" and before word "from" add phrase -- 42a, 44a and 46a, respectively, --.
Line 19, after word "inner" and before word "surface" add word -- peripheral --.
Line 23, after word "patches" delete words "of bonding".
Line 24, before number "32b" delete word "material"; and after number "32b" add phrase -- of bonding material --; and after word "inner" and before word "surface" add word -- peripheral --.
Line 25, after word "patch" delete phrase "of bonding material"; after number "34b" add phrase -- of bonding material --; and after word "inner" and before word "surface" add word -- peripheral --.
Line 28, after word "areas" and before number "42b" delete phrase "of" non-bondable" material" and after number "46b" add phrase -- of "non-bondable" material --.
Line 30, after word "to" and before word "patches" delete phrase "bonding material"; and after number "36b," add phrase -- of bonding material --.
Line 31, after word "comprise" delete word "the".
Line 32, before number "42b" change phrase "non-bondable material" to word -- areas --.
Lines 35 and 37, after word "the" and before word "patches" delete phrase "bonding material".
Line 50, before word "of" change word "areas" to word -- patches --.

Column 7,
Line 4, after word "plant" and before "." add following -- and has patches 32c, 34c and 36c of bonding material disposed on an inner surface thereof. --.
Line 19, after word "element," and before word "as" delete phrase "or " detaching means".
Line 20, after word "element" delete words "or means".
Line 38, after word "sleeve" and before word "of" add number -- 10c --.
Line 39, after word "material" and before word "disposed" add phrase -- (not shown) --.
Line 40, after phrase "end portion" add number -- 56 --; after phrase "upper portion" add number -- 50 --; and after word "sleeve" add number -- 10c --.
Line 41, after phrase "upper portion" add number -- 50 --.

UNITED STATES PATENT AND TRADEMARK OFFICE
CERTIFICATE OF CORRECTION

PATENT NO. : 6,176,372 B1
DATED : January 23, 2001
INVENTOR(S) : Donald E. Weder It is certified that error appears in the above-identified patent and that said Letters Patent is hereby corrected as shown below:

Column 7 (cont'd),
Lines 42 and 44, after word "sleeve" add number -- 10c --.
Line 45, after word "outer" add word -- peripheral --; after word "surface" add number -- 16c --; and after word "lower" add phrase -- portion 52 --.
Line 46, after word "portion" add number -- 50 --; after word "outer" add word -- peripheral --; and after word "surface" add number -- 16c --.
Line 47, after word "portion" add number -- 52 --.
Line 48, after word "sleeve" add number -- 10c --; and after word "end" add number -- 56 --.
Line 49, after word "portion" add number -- 50 --; and after word "sleeve" add number -- 10c --.
Line 58, after words "upper end" add number -- 56 --.

Column 8,
Line 8, after word "drainage" delete word "means".
Line 9, delete phrase "(e.g., holes)" and replace with word -- holes --.

Column 9,
Line 4, after word "drainage" delete word "means".

Signed and Sealed this

Seventeenth Day of August, 2004

JON W. DUDAS
*Acting Director of the United States Patent and Trademark Office*